United States Patent

[11] 3,610,653

[72] Inventor Phillip A. Derrwaldt
 Brookfield, Wis.
[21] Appl. No. 860,889
[22] Filed Sept. 25, 1969
[45] Patented Oct. 5, 1971
[73] Assignee D. G. Beyer Inc.
 Milwaukee, Wis.

[54] AUXILIARY LOAD DISTRIBUTING AND STABILIZING ASSEMBLY
 7 Claims, 4 Drawing Figs.

[52] U.S. Cl. .................................................. 280/81,
 280/150 A, 280/150.5
[51] Int. Cl. ............................................... B62d 13/06
[50] Field of Search ............................................. 280/150.5,
 150 C, 150 A, 81, 405

[56] References Cited
UNITED STATES PATENTS
1,415,008 5/1922 Barber .......................... 280/150.5

| 1,492,487 | 4/1924 | Stokes .......................... | 280/150 |
| 3,107,021 | 10/1963 | Dempster et al. .............. | 280/150.5 |
| 3,310,181 | 3/1967 | Symmank ..................... | 280/150.5 |
| 3,161,418 | 12/1964 | Brennan et al. ............... | 280/405 |
| 3,442,530 | 5/1969 | Guinot .......................... | 280/150.5 |

Primary Examiner—Benjamin Hersh
Assistant Examiner—Robert R. Song
Attorneys—John W. Michael, Gerrit D. Foster, Bayard H. Michael, Paul R. Puerner, Joseph A. Gemignani, Andrew O. Riteris, Daniel Van Dyke and Spencer B. Michael ABSTRACT: A pair of wheels and shrouds are mounted behind the rear wheels of a load-hauling vehicle and are arranged with the wheels adapted to telescope one within each of the shrouds. The wheels and shrouds are pivotally mounted for movement about the same axis for either independent or joint movement toward and away from engagement with the ground. Wheel engagement with the ground cooperates in load distribution during transportation while shroud engagement enhances vehicle stability during loading and unloading.

PATENTED OCT 5 1971 3,610,653

Inventor
Philip A. Derrwaldt
By Joseph A. Genignani
Attorney

AUXILIARY LOAD DISTRIBUTING AND STABILIZING ASSEMBLY

BACKGROUND OF INVENTION

1. Field of Invention

This invention relates to load-hauling vehicles and, more particularly, to the distribution of the effective weight of a load carried by such vehicles and to the stabilization of such vehicles during loading and unloading.

2. Description of Prior Art

Load distribution and vehicle stabilization are generally recognized problems. Support jacks for static stability and auxiliary wheel assemblies for load equalization have been proposed in the past. Many such proposals do not include both types of devices and, where both are provided, they are generally separate devices which complicates the overall vehicle structure. In addition, a typical drawback to most jack arrangements is that the jack is not disposed at the rear of the truck frame or is not adaptable to such a position without complex and relatively expensive support frames. A typical drawback to prior auxiliary wheel proposals is that they are not readily adaptable to use on vehicles for carrying load containers which are to be discharged over the rear of the vehicle.

SUMMARY OF INVENTION

A principal object of this invention is to provide a relatively simple and inexpensive auxiliary assembly which is adapted to act both as a load distributor, or equalizer, and static vehicle stabilizer. An additional object is to provide such an assembly which is relatively simple in construction and is particularly adapted to use on trucks which have rear loading and unloading capability.

For the achievement of these and other objects, this invention proposes an auxiliary assembly mounted at the rear end of a vehicle frame. The assembly includes wheels and stabilizer jacks together with power means for raising and lowering the wheels and the jack means toward and away from engagement with the ground. The wheels and jack means preferably pivot on coincident axes and the wheels are capable of movement independently of or jointly with the jack means. Under heavy load conditions, the wheels are lowered into contact with the ground to distribute the axle load and, during loading and unloading, the jack means can be lowered to stabilize the vehicle. Preferably, the assembly is comprised of two separate units having a jack and wheel mounted behind the rear wheels of the vehicle on each side of the vehicle. The assembly permits greater maximum load transportation within legal axle load limits and also provides static stability during loading and unloading.

DESCRIPTION OF PREFERRED EMBODIMENT

Figure 1:
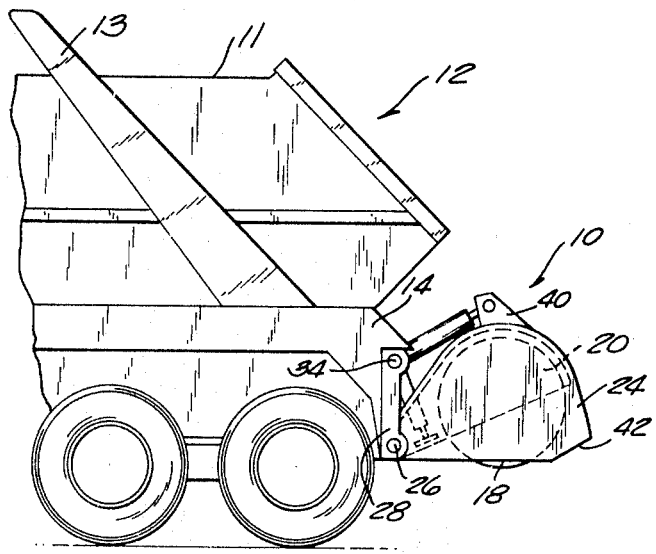
FIG. 1 shows a side elevation view of the proposed invention.
Figure 2:
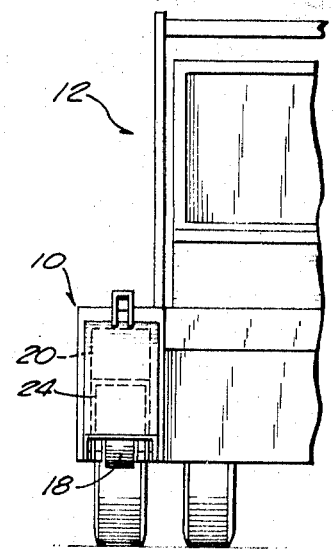
FIG. 2 shows an end view of the assembly shown in FIG. 1.

Referring to the drawings in detail, the auxiliary assembly proposed by this invention is shown generally at 10 in FIGS. 1–4. The assembly is shown in combination with a heavy-duty truck 12 which can be of the type, for example, used in hauling industrial trash receptacles 11 which are unloaded by being lifted, on chains (not shown) attached to arms 13, out over the rear of the vehicle. The details of the truck other than the auxiliary assembly are conventional and, therefore, unnecessary to describe for auxiliary of this disclosure. Assembly 10 is directly connected to the rear portion of frame 14. Preferably two identical assemblies are mounted rearward of the truck on each side thereof. Since both assemblies are identical, only one assembly has been disclosed and will be described in detail.

Figure 4:
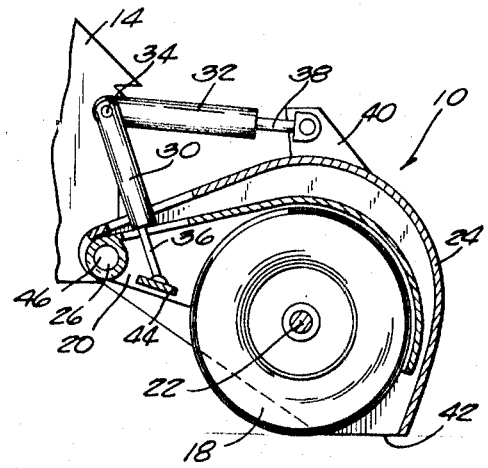
FIG. 4 is a cross section of the assembly with the wheel and shroud lowered.

As shown in FIG. 4, assembly 10 includes a wheel 18 carried on an axle 22 suitably journaled in pillow blocks (not shown) carried in inner shroud 20. An outer shroud 24 encloses wheel 18 and inner shroud 20, shroud 24 providing the stabilizing jack contemplated by this invention and also providing a measure of protection for the inner shroud and wheel. Shrouds 20 and 24 are pivotally mounted for movement on the same pivot axis 26. The shrouds are connected to an adapter frame 28 which is connected directly to the rear end of vehicle frame 14. The axle 22 on which wheel 18 is mounted does not extend beyond the inner or outer shroud. Shroud 24 and shroud 20, with wheel 18, are free to be pivoted about axis 26 jointly or independently toward and away from engagement with the ground.

Figure 3:
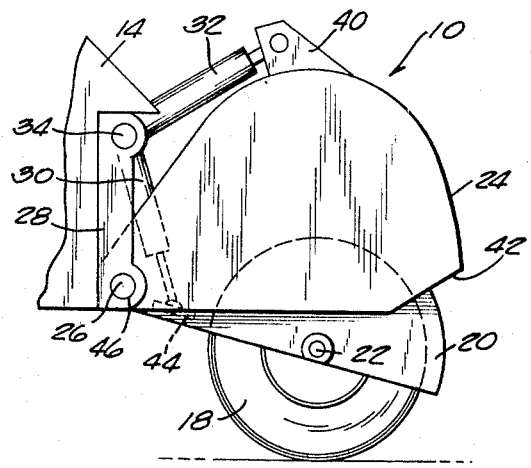
FIG. 3 shows the assembly proposed by this invention with the wheel engaging the ground.

Two dual-acting hydraulic ram cylinders 30 and 32 are provided for raising and lowering wheel 18 and shroud 24. Cylinders 30 and 32 are pivotally mounted about axis 34 fixed relative to frame 14 and spaced vertically above axis 26. The free end of cylinder 30, i.e. ram 36 is pivotally connected to inner shroud 20, while the free end of ram 38 of cylinder 32 is pivotally fixed to shroud 24. Ram 38 is suitably joined to shroud 24 through a connector bracket 40 and the bracket and position of axis 34 are selected so that cylinder 32 is substantially horizontal when shroud 24 is in contact with the ground as shown in FIG. 4. This reduces the angle of rotation of cylinder 32 as the shroud is raised and lowered and also provides sufficient clearance between cylinder 32 and shroud 24 in the raised position as shown in FIGS. 1 and 3. Thus, shroud 24 can be lowered to engage the ground and it should be noted that only the rear edge and surface 42 of shroud 24 contacts the ground when shroud 24 is used in this manner, i.e. as a jack. When so positioned, pressure is maintained on ram 38 and the shroud cooperates in supporting the truck as the load (the container) is lifted over the rear of the truck. The point of application of the jack force (surface 42) is below the fixed axis of cylinder 32 and the point of connection of the ram 38 to the shroud (bracket 48). Moreover, the point of shroud connection is offset from a line from the fixed axis to surface 42. This arrangement is preferred as it results in most effective application of jack forces. Also it will be noted that hydraulic cylinders 30 and 32 are mounted on a common pivot axis 34. This provides maximum rearward stability as the load is discharged over the rear end of the truck and prevents the front end of the truck from raising off the ground.

Ram 36 is conveniently attached to swing arm 34 which is connected to shroud 20. By operating cylinder 30, wheel 18 can be moved relative to shroud 24 into and out of engagement with the ground. During over-the-road hauling with a full load on the truck, wheels 18 (on both sides of the truck) are lowered to engage the ground. This provides an additional wheel system to share the axle load. Moreover, experience has shown that an additional portion of the load is transferred to the front wheels of the truck, i.e. a portion of the load in addition to that normally carried by the front wheels. Thus, the auxiliary wheels result in better load equalization and distribution on the wheels which can also increase the legal load which can be carried by the truck.

The wheels can be lowered independently of the shrouds 24 for over-the-road hauling. Hydraulic pressure is maintained on cylinder 30 when the wheels 18 are in operation. The shrouds 24 can be partially lowered to protect the wheels during hauling. For unloading, or loading, the shrouds are fully extended to engage the ground and act as jacks, in so doing the shrouds may raise the wheels 18 from the ground. This versatile operation is controlled remotely through a generally conventional hydraulic system, the hydraulic system being conventional has not been illustrated and will not be described.

It will also be noted that the wheel and shroud assembly illustrated is confined to one side of the truck, the same is true for the assembly on the other side of the truck. This leaves the rear of the truck generally unobstructed for ready loading and unloading of containers 11.

Although but a single embodiment of the present invention has been illustrated and described, it will be apparent to those skilled in the art that various changes and modifications may be made therein without departing from the spirit of the invention.

1. An auxiliary assembly for a vehicle comprising in combination:

wheel means;

means for pivotally mounting said wheel means on the rear portion of a vehicle frame behind the rear wheels of said vehicle for movement about an axis for raising and lowering said wheels into and out of engagement with the ground;

jack means including a first shroud mounted to fit over said wheel means;

means for pivotally mounting said jack means on the rear portion of said frame behind the rear wheels of said vehicle for movement about an axis for raising and lowering said jack means into and out of engagement with the ground;

and means connected to said wheel means and jack means and operable to raise and lower said wheel means and said jack means jointly or independently so that, when said vehicle is in motion, said wheel means may be lowered to cooperate with the remaining vehicle wheels in load carrying and, when said vehicle is standing, said jack means may be lowered to provide stability for said vehicle.

2. The assembly according to claim 1 wherein said first shroud and wheel means are mounted for pivotable movement about generally coincident axes.

3. The assembly according to claim 2 wherein said wheel means comprise a pair of wheels mounted separately, one on each side of said [vehicle frame, and said jack means includes a pair of said first shrouds each mounted to fit over each of said wheels, said wheel means and jack means at each side of said vehicle mounted on axle means providing said coincident axes with the axle means mounting the wheel means and jack means on one side of said vehicle being separate from the axle means mounting the wheel means and jack means on the other side of said vehicle.

4. The assembly according to claim 3 wherein said means for raising and lowering said wheel and jack means comprise hydraulic ram cylinder means connected to each of said wheel means and jack means for moving said wheel means and jack means jointly and independently.

5. The assembly according to claim 3 including a pair of second shrouds, one in telescoping relation with each of said first shrouds, and wherein each of said wheel means is rotatably mounted within one of said second shrouds for pivotal movement therewith.

6. An auxiliary assembly for a vehicle comprising, in combination:

a wheel;

means mounting said wheel for rotation about its own axis and for pivotal movement about a second axis to permit raising and lowering said wheel into and out of engagement with the ground;

jack means including a first shroud adapted to fit over and enclose said wheel, means mounting said shroud for movement on said second axis for pivotal movement jointly with and independently of said wheel into and out of engagement with the ground;

and means for raising and lowering said wheel and said jack means jointly and independently so that when said vehicle is in motion, said wheel may be lowered to provide load equalization and, when said vehicle is standing, said jack means may be lowered to provide static stability.

7. The assembly according to claim 6 including a second shroud in telescoping relation within said first shroud, and wherein said wheel is rotatably mounted within said second shroud for pivotal movement therewith.